United States Patent [19]  [11]  4,160,751
Bock et al.  [45]  Jul. 10, 1979

[54] LOW PRESSURE INJECTION MOLDABLE COMPOSITIONS

[75] Inventors: Jan Bock, Houston, Tex.; Robert D. Lundberg, Bridgewater; Henry S. Makowski, Scotch Plains, both of N.J.

[73] Assignee: Exxon Research & Engineering Co., Florham Park, N.J.

[21] Appl. No.: 855,765

[22] Filed: Nov. 29, 1977

[51] Int. Cl.$^2$ ............................................. C08L 91/00
[52] U.S. Cl. ........................ 260/23.5 A; 260/33.6 AQ; 260/33.6 PQ; 260/42.33; 260/42.47; 260/DIG. 31
[58] Field of Search ............ 260/79.3 R, 42.33, 42.47, 260/33.6 AQ, 33.6 PQ, 28.5 B, 878 B, 879 R, DIG. 31

[56] References Cited
U.S. PATENT DOCUMENTS

| | | | |
|---|---|---|---|
| 3,642,728 | 2/1972 | Canter | 260/890 |
| 3,847,854 | 11/1974 | Canter et al. | 260/32.6 PQ |
| 3,974,241 | 8/1976 | Lundberg et al. | 260/889 |
| 4,014,831 | 3/1977 | Bock et al. | 260/23.7 B |

Primary Examiner—Lewis T. Jacobs
Attorney, Agent, or Firm—Richard E. Nanfeldt

[57] ABSTRACT

This invention relates to injection moldable type elastomeric compositions having a viscosity at 200° C. at 0.73 sec$^{-1}$ of less than about $8 \times 10^4$ poises. The compositions used for elastomeric articles include 100 parts of a neutralized sulfonated EPDM terpolymer; about 25 to about 150 parts per hundred of a non-polar process oil; about 25 to about 200 parts per hundred of a filler; and a preferential plasticizer at about less than 50 parts per hundred based on 100 parts of the sulfonated elastomeric polymer. The composition may also include a crystalline polyolefinic thermoplastic at least than about 100 parts per hundred by weight.

These blend compositions can be readily processed due to their superior rheological properties on conventional plastic fabrication equipment, especially on low pressure injection molding equipment into elastomeric articles having excellent physical properties and desirable rubbery characteristics.

27 Claims, No Drawings

LOW PRESSURE INJECTION MOLDABLE COMPOSITIONS

FIELD OF THE INVENTION

This invention relates to injection moldable type elastomeric compositions having a viscosity at 200° C. at 0.73 sec$^{-1}$ of less than about $8 \times 10^4$ poises. The compositions used for elastomeric articles include 100 parts of a neutralized sulfonated EPDM terpolymer; about 25 to about 150 parts per hundred of a non-polar process oil; about 25 to about 200 parts per hundred of a filler; and a preferential plasticizer at about less than about 50 parts per hundred based on 100 parts of the sulfonated elastomeric polymer. The composition may also include a crystalline polyolefinic thermoplastic at less than about 100 parts per hundred by weight.

These blend compositions can be readily processed due to their superior rheological properties on conventional plastic fabrication equipment, especially on low pressure injection molding equipment into elastomeric articles having excellent physical properties and desirable rubbery characteristics.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized with a basic material to form an ionically cross-linked elastomer having substantially improved physical properties over an unsulfonated elastomer at room temperature. However, these ionically cross-linked elastomers may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of this patent are readily useable in a certain number of limited applications, they are not as readily adaptable for the manufacture of an injection moldable elastomeric article such as footwear as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process are not as suitable for the manufacture of high performance elastomeric articles such as footwear formed by an injection molding process as are the compositions of the present invention.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the compositions of the present invention are more adaptable for use in the manufacture of high performance elastomeric articles.

Products resulting from the aforementioned methods for obtaining neutralized sulfonated elastomeric compositions, possess either unsuitable rheological or physical properties for the applications envisioned in the present invention.

For example, the physical properties of these resultant sulfonated elastomeric products of these aforementioned patents are unsuitable for a major application of an injection molding process, namely the manufacture of footwear, wherein excellent resilience, dimensional stability, excellent low and high temperature flexibility, excellent flex fatique, and excellent abrasion are needed. Furthermore, the high melt viscosity and melt elasticity of these materials makes injection molding difficult if not impossible. These materials of the aforementioned patents which are generally processable by only compression molding have unsuitable physical properties for this major application of footwear.

The materials cost of the compositions of the instant invention is substantially reduced over those of the aforementioned patents, wherein these previous patents failed to realize the criticality of the proper selection of the chemical and physical uniqueness of the basic elastomeric backbone, the degree of sulfonation, the proper selection of neutralizing agent in conjunction with plasticization, and the ability to extend these sulfonated polymers with oils and fillers. Unsulfonated elastomers, when extended with oils and fillers, show a general deterioration in physical and rheological properties as is clearly shown in the Detailed Description of the present invention. Quite surprisingly, through the proper selection of oil and filler within a critical ratio of filler to oil, the sulfonated elastomeric compositions of the present invention show a marked improvement in both rheological and physical properties.

U.S. Pat. application Nos. 542,502 and 524,512 filed on Nov. 18, 1974, describe the blending of a crystalline polyolefinic material with a neutralized sulfonated elastomeric polymer in an attempt to improve both the rheological and physical properties of the elastomeric polymer. The selection of the use of the crystalline polyolefinic material to improve both the stiffness as well as improving the melt viscosity of the composition was based in part upon the limitation of the use of fillers such as carbon black, clays, calcium carbonate or silicates as a single additive to the elastomeric polymer. Although fillers in combination with an elastomeric polymer increase the hardness of the composition, these fillers deteriorate the melt viscosity of the resultant composition. These materials are more adaptable for stiff elastomeric articles such as rubberized chair tips or wheels whereas the compositions of the present invention are more adapted for flexible elastomeric articles such as elastomeric footwear.

The unique and novel improved compositions of the present invention overcome the deficiencies of the aforementioned U.S. Patents and applications from both a rheological and physical properties aspect. The blend compositions of the present invention solve the problem of having a material which has both desirable rheological and physical properties for the manufacture of an elastomeric article as an elastomeric footwear, wherein the extrudate of the resultant compositions do not exhibit melt fracture during extrusion processing as in the case in some of the aforementioned patents.

SUMMARY OF THE INVENTION

It has been found surprisingly that compositions formed from blends of neutralized sulfonated elastomeric materials, in particular a select class of neutralized sulfonated elastomeric polymers, inorganic fillers, a non-polar process oil and a preferential plasticizer have suitable rheological and physical properties for the formation of an elastomeric article, namely a footwear, by a low pressure injection molding process.

Accordingly, it is an object of our present invention to provide unique and novel compositions of matter for producing a high performance elastomeric article by a low pressure injection molding process, wherein the compositions of the elastomeric article have a viscosity at 0.73 sec$^{-1}$ at 200° C. of less than about $8 \times 10^4$ poises, and a Shore A Hardness of about 45 to about 85.

It is the object of the instant invention to describe a class of compounds based on sulfonated ethylenepropylene terpolymers which can be processed on plastics type extrusion equipment at high rates and which possess improved physical characteristics such as abrasion, flexibility and rubbery feel. One of the essential aspects of the present invention comprises the discovery that only a restricted class of the subject sulfonated elastomers may be readily employed for low pressure injection molding fabrication. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated elastomers.

A substantial segment of the plastics and rubber fabrication industry employs a fabrication technique known as low pressure injection molding to form articles which can be classified as injection molded articles. As application employing this fabrication technique is elastomeric footwear which requires materials which are flexible and tough. Two broad classifications of materials which have been used are vulcanized elastomers and plasticized thermoplastics such as polyvinyl chloride (PVC). The fabrication of injection molded articles based on vulcanized elastomers is a major item of cost involving the vulcanization procedure. Not only is this step costly from an energy intensive viewpoint, but it is time consuming. The use of plasticating injection molding equipment for thermoplastic materials is more economical and results in high production rates for materials such as plasticized PVC. While these materials possess a degree of flexibility, they do not have a good rubbery feel or good low temperature flexibility. It is therefore desirable to have materials which can be processed on plastics type injection molding equipment at conventional plastics rates and which possess the flexibility and subjective rubbery characteristics of vulcanized elastomers.

GENERAL DESCRIPTION

This present invention relates to unique and novel blend compositions of a neutralized sulfonated elastomeric polymer, an inorganic filler, and a non-polar process oil, wherein the resultant composition has a viscosity at 0.73 sec$^{-1}$ at 200° C. of less than about $8 \times 10^4$ poises, wherein the compositions are readily processable in a conventional injection molding process into a high performance elastomeric article such as footwear. The resultant elastomeric article has excellent low and elevated temperature flexibility, excellent abrasion resistance, excellent flex fatigue, superior dimensional stability, good resilience, and a rubber-like feel, and a Shore A Hardness of about 45 to about 85.

Various critically selected additives can be incorporated into the blend compositions such as a polyolefin thermoplastic for further modification of hardness as well as rheological properties, a whitening pigment, a lubricant for improvement of the physical appearance such as shine of the finished footwear as well as the ability to easily eject the formed article from the mold during the injection molding process and a reinforcing filler such as silica or carbon black, wherein the reinforcing filler constitutes a minor portion of the composition.

The neutralized sulfonated elastomeric polymer of this present instant invention are derived from unsaturated polymers which include low unsaturated elastomeric polymers such as Butyl rubber, or EPDM terpolymers.

Alternatively, other unsaturated polymers are selected from the group consisting essentially of partially hydrogenated polyisoprenes, partially hydrogenated polybutadienes, Neoprene, styrene-butadiene copolymers of isoprene-styrene random copolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000, especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+3, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 50 to about 70 wt. % ethylene, e.g. 50 wt. % and about 2.6 to about 8.0 wt. % diene monomer, e.g. 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 40 wt. % and a 5-ethylidene-2-norbornene content of about 5.0 wt. %. The $\overline{M}n$ of Vistalon 2504 is about 47,000, the $\overline{M}v$ is about 145,00 and the $\overline{M}w$ is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000, more preferably of about 15,000 to about 100,000, and most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

In carrying out the invention, the elastomeric polymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane, or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for this invention is an acyl sulfate selected from the group consisting essentially of benzoyl, acetyl, propionyl or butyryl sulfate. The acyl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cyclo aliphatic alcohol such as a cyclohexanol or with water. The acid form of the sulfonated elastomeric polymer has about 10 to about 100 meq. $SO_3H$ groups per 100 grams of sulfonated polymer, more preferably about 15 to about 50, and most preferably about 20 to about 40. The meq. of $SO_3H/100$ grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated polymer is gel free and hydrolytically stable. Gel is measured by stirring a given weight of polymer in a solvent comprised of 95 toluene/5 methanol at a concentration of 5 wt. % for 24 hours, allowing the mixture to settle, withdrawing a weighed sample of the supernatant solution and evaporating to dryness.

Hydrolytically stable means that the acid function in this case the sulfonic acid, will not be eliminated under neutral or slightly basic conditions to a neutral moiety which is incapable of being converted to highly ionic functionality.

Neutralization of the acid form of the sulfonated elastomeric polymer is done by the addition of a solution of a basic salt to the acid form of the sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from antimony, aluminum, lead or Groups I-A, II-A, I-B or II-B of the Periodic Table of Elements and mixtures thereof. The anion of the basic salt is selected from a carboxylic acid having from about 1 to 4 carbon atoms, a hydroxide or alkoxide and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the acid groups, more preferably about 98%, most preferably 100%.

Examples of metal oxides useful in preparing metal sulfonates are MgO, CaO, BaO, ZnO, Ag$_2$O, PbO$_2$ and Pb$_3$O$_4$. Useful examples of metal hydroxides are NaOH, KOH, LiOH, Mg(OH)$_2$ and Ba(OH)$_2$. The resultant neutralized sulfonated terpolymer has a viscosity at 0.73 sec$^{-1}$ at 200° C. of about $3 \times 10^5$ poises to about $5 \times 10^6$ poises, more preferably of about $3 \times 10^5$ poises to about $3 \times 10^6$ poises and most preferably about $5 \times 10^5$ poises to about $3.0 \times 10^6$ poises.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity at 200° C. and at a shear rate of 0.73 sec$^{-1}$ (0.005 in/min) is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

The metal sulfonate containing polymers at the higher sulfonate levels possess extremely high melt viscosities and are thereby difficult to process. The addition of ionic group plasticizers markedly reduces melt viscosity and frequently enhances physical properties.

To the neutralized sulfonated elastomeric polymer is added, in either solution or to the crumb of the acid form of the sulfonated elastomeric polymer, a preferential plasticizer selected from the group consisting essentially of carboxylic acid having about 5 to about 30 carbon atoms, more preferably about 8 to about 22 carbon atoms, or basic salts of these carboxylic acids wherein the metal ion of the basic salt is selected from the group consisting essentially of aluminum, iron, antimony, lead or Groups I-A, II-A I-B or II-B of the Periodic Table of Elements and mixtures thereof. The carboxylic acids are selected from the group consisting essentially of lauric, myristic, palmitic, or stearic acids and mixtures thereof; e.g. zinc stearate, magnesium stearate, or zinc laurate.

The preferential plasticizer is incorporated into the neutralized sulfonated elastomeric polymer at about 0 to about 60 parts per hundred by weight based on 100 parts of the sulfonated polymer, more preferably at about 5 to about 40, and most preferably at about 7 to about 25. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from organic esters, phenols, trialkyl phosphates, alcohols, amines, amides, ammonium and amine salts of carboxylic acids and mixtures thereof. The preferred plasticizers are selected from fatty acid or metallic salts of fatty acid and mixtures thereof. The resultant neutralized sulfonated elastomeric polymer with preferential plasticizer is isolated from the solution by conventional steam stripping and filtration.

The resultant neutralized and plasticized sulfonated elastomer has a viscosity at 200° C. and a shear rate of 0.73 sec$^{-1}$ of about $5 \times 10^4$ poise to about $1 \times 10^6$ poise, more preferably of about $5 \times 10^4$ poise to about $8 \times 10^5$ poise and most preferably of about $8 \times 10^4$ poise to about $8 \times 10^5$ poise.

The neutralized sulfonated elastomeric polymer is blended with a filler and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

The fillers employed in the present invention are selected from talcs, ground calcium carbonate, water precipitated calcium carbonate, or delaminated, calcined or hydrated clays and mixtures thereof. These fillers are incorporated into the blend composition at about 25 to about 300 parts per hundred, more preferably at about 25 to about 250 and most preferably at about 25 to about 200. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE 1

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil XB | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Talc magnesium silicate | Mistron Vapor | 60–70 | 2.75 | 2 | 9.0–7.5 |

The oils employed in the present invention are nonpolar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 20 to about 200 parts per hundred, more preferably at about 20 to about 175, and most preferably at about 25 to about 150.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

The filler to oil ratio in the present instant application is critical and should be about 0.2 to about 2, more preferably 0.5 to about 1.75 and most preferably about 0.75 to about 1.25.

Various other additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of about 0 to about 100 parts per hundred by weight based on 100 parts of sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably, the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of about 0 to about 25 parts per hundred by weight based on 100 parts of sulfonated polymer, more preferably about 0 to about 15. Alternatively, a Rutile or Anatase titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 5.0 parts per hundred based on 100 parts of the neutralized sulfonated elastomeric polymer, wherein the metal ion of the metallic hydroxide is selected from Group II-A of the Periodic Table of Elements such as barium, calcium, or magnesium.

A lubricant can be employed in the blend composition at a concentration level of about 0 to about 20 parts per hundred based on 100 parts of the neutralized sulfonated elastomeric polymers, and more preferably about 0 to about 15. The lubricants of the present instant invention are nonpolar paraffinic hydrocarbon waxes having a softening point of about 135° F. to about 220° F., more preferably 150° F., to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as additives to the blends of sulfonated polymer, filler and oil, wherein the reinforcing filler is selected from the group consisting essentially of silica, carbon black, or calcium silicate and mixtures therein. These reinforcing agents are generally characterized as having particle sizes below 0.1 microns and oil absorption above about 100. These reinforcing fillers are incorporated in the blend composition at about 0 to 50 parts per hundred based on 100 parts of sulfonated polymer, more preferably 0 to 25. The ratio of filler to reinforcing agent is at least about 1, more preferably about 2, and most preferably about 3.

The ingredients incorporated into the blend compositions of the present invention, in conjunction with the type of elastomeric polymer, the degree of sulfonation, and the metal counterion of the neutralized sulfonated elastomeric polymer, and the plasticizer give materials processable by extrusion or injection molding processes into elastomeric articles having the desirable physical and rheological properties. These combined physical properties and rheological processability characteristics were not previously obtainable in the aforementioned U.S. patents and applications previously incorporated herein by reference.

This present invention is related to two other applications filed on the same day herewith, entitled "Elastomeric Compositions" Ser. No. 855,757 and "Flow Modifiers for Sulfonated Elastomers" Ser. No. 855,726 in the names of J. Bock, R. D. Lundberg and H. S. Makowski. The difference between the present invention and the "Elastomeric Compositions" in both the resultant rheological and physical properties of the compositions are unexpectedly different and ideally applicable to different fabrication techniques for the manufacture of vastly different elastomeric articles. The invention, "Flow Modifiers for Sulfonated Elastomers" relates to the use of hydrocarbon waxes used as flow modifiers and physical property improvers which are also used in the present invention for modification of flow properties of the compositions.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE I—PREPARATION OF SULFONATED EPDM

One hundred grams of an EPDM terpolymer Vistalon 2504-20 was dissolved under agitation in 1000 ml. of n-hexane at 40° C. The resultant cement was cooled to room temperature and 5.74 ml. of acetic anhydride (60.75 mmoles) was then added. While stirring the mixture, 2.1 ml. of 95% $H_2SO_4$ (37.5 mmoles) was added dropwise. The sulfonation reaction was quenched after 30 minutes with 150 ml. of isopropanol. The acid form of the sulfonated polymer was analyzed by Dietert Sulfur Analysis to have 33 meq. of $SO_3H$ groups per 100 grams of sulfonated polymer. To the quenched sulfonated cement was added with stirring for thirty minutes 25.6 grams (90 mmoles/100 grams of EPDM) of stearic acid. A solution of 9.87 grams (90 meq./100 g. of EPDM) of zinc acetate dihydrate dissolved in 25 ml. of distilled water was then added in the cement and the cement stirred for an additional 30 minutes. Antioxidant 2246 (0.5 grams) was then added to the cement. The resultant plasticized, neutralized sulfonated EPDM terpolymer was then isolated by steam stripping and drying on a rubber mill at 220° F., wherein the sulfonated terpolymer has an apparent viscosity at 0.73 $sec^{-1}$ at 200° C. of about $3.3 \times 10^5$ poise. This material was incapable of being injection molded on a low pressure Desma machine equipped with a standard canvas footwear type mold.

EXAMPLE II—LOW PRESSURE INJECTION MOLDABLE COMPOSITIONS (A) The Sulfonated EPDM Gum The sulfonated EPDM gum was prepared in an identical manner as described in Example I. Three compounds were prepared by combining A with the ingredient type and concentration as shown in Table III in a 60 cc. mixing chamber (manufactured by C. W. Brabender) attached to a Plasticorder and equipped with Banbury type rotors. The mixing chamber was heated to approximately 125-145° C. and an upside-down mix employed. This involved adding the filler, oil (if present) sulfonated polymer, and plastic (if present) sequentially. The rotor speed was set at 50 rpm and approximately 3 to 5 minutes after the addition of all ingredients, fluxing was indicated by the torque chart of the Plasticorder. At approximately seven minutes into the mix cycle, the rotor speed was increased to 100 rpm and the mix dumped at approximately 10 minutes in the form of a coherent slab.

TABLE III

| COMPOUNDS BASED ON SULFO-EPDM | | | |
|---|---|---|---|
| Sample | 1 | 2 | 3 |
| Ingredient | | | |
| A sulfonated EPDM | 100 | 100 | 100 |
| Process Oil-Sunpar 2280 | | 50 | 85 |
| Polyethylene (HDPE) | 54 | | |
| Polyethylene (LDPE) | | 25 | |
| Calcium Carbonate (Atomite) | | 80 | |
| Calium Carbonate (Purecal U) | | | 40 |
| Talc - Mistron Vapor | | 15 | |
| Paraffin Wax (F 3504) | | | 15 |
| Zinc Oxide (Protox 166) | 25 | 15 | 25 |
| Magnesium Hydroxide | 1.8 | 1.5 | .57 |

The fillers employed in these mixes are described in Table I. Atomite is a natural ground calcium carbonate, Purecal U is a precipitated calcium carbonate, and the Mistron Vapor is a standard magnesium silicate. The process oil employed was Sunpar 2280, a paraffinic oil supplied by Sun Oil Co. The property characteristics of the oil are described in Table II. The high density polyethylene (HDPE) was supplied by Phillips and designated Marlex 6050 possessing an MFR of 6 while the low density polyethylene was LD-610 (Exxon) and had an M.I. of 30.

(B) Determination of Low Pressure Injection Moldability

The compounds described in Part A were prepared in an effort to determine a criterion for fabrication on a low pressure injection molding machine such as a Desma or a Vulcaplast. Compound number 1, a composition described in U.S. patent application No. 542,502 had previously been observed to be injection moldable on a conventional (high pressure) injection molder. However, in a low pressure Desma injection molder equipped with a standard gated canvas sneaker mold, it was not possible to fill the mold over the available range of injection pressure, injection speed, and temperatures between 350° to 450° F. Compound 2 could only be molded at the maximum available injection pressure and at a temperature of at least 400° F. Thus, compound 2 was barely fabricable in a low pressure injection molder. Surprisingly, compound 3 was found to be readily moldable at the midrange in injection pressure and at a temperature between 350° to 400° F.

Determination of the melt rheological characteristics of compounds 1, 2 and 3 indicated the criterion for low pressure injection moldability. The rheological measurements were determined on an Instron Capillary Rheometer (plunger diameter=0.375", capillary diameter=0.05", and length to diameter ratio of capillary=20). At a temperature of 200° C., the apparent viscosity was determined at a range of steady shear rate values. Table IV shows this rheological data for the compounds described above.

TABLE IV
RHEOLOGY OF S-EPDM COMPOUNDS
APPARENT VISCOSITY × $10^{-4}$ POISE AT 200° C.

| Compound No. | 1 | 2 | 3 |
|---|---|---|---|
| Shear Rate ($sec^{-1}$) | | | |
| .74 | 31.1 | 8.3 | 3.2 |
| 7.4 | 11.1 | 2.4 | 1.4 |
| 74 | 3.6 | .82 | .43 |
| 294 | — | .40 | .20 |
| 740 | — | .24 | .12 |
| Melt Fracture Onset Shear Rate ($sec^{-1}$) | 294 | 1470 | 3000 |
| Injection (Low Pressure) Moldable | NO | Marginal | Yes |

As shown in Table IV, the melt viscosities at 200° C. of the compounds differ substantially. However, the viscosity-shear rate functionality appears to be similar for the compounds. For example, the ratio of viscosity of 0.74 $sec^{-1}$ shear rate to that at 74 $sec^{-1}$ shear rate is approximately 9, 10 and 8 for compounds, 1, 2 and 3 respectively. Thus specifying the viscosity at a given temperature and shear rate for a compound based on sulfo-EPDM specifies approximately the viscosity over a range of shear rates. Thus, it appears that specification of the viscosity at 0.74 $sec^{-1}$ shear rate would yield the criterion for injection moldability. Since compound 2 was barely injection (low pressure) moldable, the maximum viscosity at 200° C. and at 0.74 $sec^{-1}$ shear rate will be taken to be $8 \times 10^4$ poise. Several subsequent evaluations have indicated the criticality of this maximum viscosity value in terms of injection in low pressure equipment commonly employed by the canvas footwear industry.

EXAMPLE III (A) Preparation of Sulfonated Elastomer

Two EPDM terpolymers (V-2504 and V-2504-20) were sulfonated according to the identical procedure which consist of dissolving 500 grams of the terpolymer into 5000 ml. of hexane of 40° C. for 5 hours with stirring. After cooling each cement to room temperature, 36.38 ml. of acetic anhydride was added. After stirring for 3 minutes, 13.33 ml. of 95% $H_2SO_4$ was added slowly (dropwise) to each solution and allowed to react for 30 minutes. Aliquots of these sulfonated elastomeric cements were taken, the acid form of the sulfonated elastomers was isolated, and Dietert Sulfur analysis was performed to determine the degree of sulfonation. The cements of the acid form of the sulfonated elastomers were simultaneously quenched and neutralized with a solution of 62.56 grams of zinc acetate in 640 ml. of methanol and 24 ml. of distilled water. The neutralization reaction was allowed to proceed for 30 minutes at which time 2.5 grams of Antioxidant 2246 (American Cyanamide) was added to the cement of each neutralized sulfonated elastomer. Each neutralized sulfonated elastomer was isolated from solution by steam stripping and subsequently drying on a steam heated rubber mill at 200° F. The neutralized sulfonated elastomers of V-2504 (A-1) and V-2504-20 (A-2) each have about 45 meq. of sulfonate groups per 100 grams of EPDM terpolymer. A-1 and A-2 was plasticized by adding a metal stearate, namely zinc stearate. To A-1 was added 30 parts by weight of zinc stearate per 100 parts of A-1. The resulting plasticized sulfonated polymer will be designated A-1-P. To A-2 was added 20 parts by weight of zinc stearate per 100 parts of A-2. This polymer will be designated A-2-P.

(B) Preparation of Compounds

Two compounds were prepared from each of the neutralized sulfonated EPDM polymers described in part A and designated as A-1-P and A-2-P. A 60 cc. mixing chamber (manufactured by C. W. Brabender) attached to a Plasticorder and equipped with Banbury type rotors was employed. The mixing chamber was heated to approximately 125° C. and an upside down mix employed. This involved adding the filler, oil, and sulfonated polymer sequentially. The rotor speed was set at 50 rpm and 3 minutes after the addition of all ingredients, fluxing was indicated by the torque chart. At seven minutes into the mix cycle, the rotor rpm was raised to 100 and the mix dumped at approximately 10 minutes in the form of a coherent slab.

The filler employed in these mixes was a natural ground calcium carbonate supplied by Thompson, Weinman & Co. called Atomite. The process oil employed was Sunpar 180, a paraffinic oil supplied by Sun Oil Co. The property characteristics of the filler and oil has been described in Tables I and II respectively. The compositions of the compounds and their designation are shown in the Table V below.

Upon attempting to prepare these formulations with the unplasticized sulfonated polymers A-1 and A-2, it was observed that fluxing did not occur in the mixing chamber after 20 minutes and the resultant material dumped in the form of an incoherent powder. The dispersion of the filler was extremely poor and could not be fabricated by extrusion or injection molding. This illustrated the criticality of the plasticizer.

TABLE V

| | COMPOSITIONS | | | | |
|---|---|---|---|---|---|
| Type | Sulfonated Polymer Level | Plasticizer Level Zinc Stearate (phr) | Filler (Atomite) Level | Oil (S-180) | Compound Designation |
| A-1 | 100 | 30 | 100 | 100 | 1 |
| A-1 | 100 | 30 | 150 | 75 | 3 |
| A-2 | 100 | 20 | 100 | 100 | 2 |
| A-2 | 100 | 20 | 150 | 75 | 4 |

(C) Rheological and Physical Properties

The melt rheological characteristics of the neutralized sulfonated ethylene propylene terpolymers and compounds derived therefrom were determined by measurements on an Instron Capillary Rheometer (plunger diameter=0.375", capillary diameter=0.05", length to diameter ratio of capillary=20). At a temperature of 200° C., the apparent viscosity was determined at a range of steady shear rate values. Table VI shows the rheological data for the gums and compounds described above. The physical properties on these materials are shown in Table VII.

TABLE VI

EXTRUSION OF SULFONATED EPDM COMPOSITIONS APPARENT VISCOSITY (POISE × $10^{-5}$) AT 200° C.

| Sample No. | A-1 | A-2 | A-1-P | A-2-P | 1 | 2 | 3 | 4 |
|---|---|---|---|---|---|---|---|---|
| Plasticizing | none | none | yes | yes | yes | yes | yes | yes |
|  |  |  |  |  | 100 filler | 100 | 150 | 150 filler |
| Compounding | none | none | none | none | 100 oil | 100 | 75 | 75 oil |
| Shear Rate (sec$^{-1}$) |  |  |  |  |  |  |  |  |
| .73 |  |  | 6.03 | 7.67 | .64 | .75 | 1.29 | 1.37 |
| 7.3 |  |  | 1.89 | 2.30 | .26 | .28 | .47 | .52 |
| 73. |  |  | .41 | .54 | .07 | .08 | .12 | .13 |
| 291 |  |  | .15 | .19 | .03 | .03 | .04 | .05 |
| 728 |  |  | .07 | .10 | .02 | .02 | .02 | .03 |
| Melt Fracture (sec$^{-1}$) |  |  | 291 | 146 | 1456 | 3000 | 1456 | 1456 |
| Injection Moldable At Low Pressure | none | none | none | none | good | good | poor | poor |

TABLE VII

PHYSICAL PROPERTIES OF COMPOUNDS

| Compound | 1 | 2 | 3 | 4 |
|---|---|---|---|---|
| Tensile Properties (R.T.) |  |  |  |  |
| 100% Mod. (psi) | 335 | 325 | 505 | 470 |
| 300% Mod. (psi) | 545 | 519 | 712 | 627 |
| Tensile Strength at break | 1564 | 1505 | 1452 | 1263 |
| Elongation at break (%) | 640 | 620 | 563 | 555 |
| Set at break (%) | 50 | 50 | 44 | 44 |
| Hardness (Shore A) | 65 | 63 | 72 | 71 |

This example illustrates some of the distinctive advantages of the compositions of the instant invention over that in the prior art and the range of molecular weights of the starting material which can be employed in the instant invention. First, the neutralized sulfonated polymers based on a precursor EPDM having a Mooney viscosity (1+8 min.) at 212° F. of 20 or 40 cannot be injection molded as shown in Table VI. Attempting to compound these materials with filler and oil results in an intractable material, i.e. nonprocessable by injection molding. Plasticizing these neutralized sulfonated polymers with a metal stearate (zinc stearate) results in materials which are relatively stiff and non-flexible and furthermore are not injection moldable on low pressure machines. The addition of a particular mineral filler, and process oil in the specified filler to oil ratio, in conjunction with the plasticizer has produced materials which exhibit flow characteristics necessary for low pressure injection molding. The criticality of the filler to oil ratio is illustrated in the rheological characteristics by the lack of melt strength and low viscosity exhibited in the compounds wherein the filler to oil ratio is 1 and the high viscosity and elasticity which preclude low pressure molding exhibited in the compounds wherein the filler to oil ratio is 2. The viscosity values for compounds 2 and 3 are just below the critical maximum described in Example II. Thus, the sulfonate level of approximately 45 meq per 100 g EPDM, the Mooney viscosity (ML, 1+8, 212° F.) of about 40 of the starting EPDM and the filler to oil ratio of about 1 are near the maximum limits necessary for producing a material which can be fabricated on a low pressure injection molding machine.

The physical properties exhibited by compounds 2 and 3 as shown in Table VII are excellent, illustrating that the Mooney viscosity of the starting EPDM in the range of 20 to 40 (ML, 1+8, 212° F.) is operable.

EXAMPLE IV—SULFONATED BUTYL COMPOUNDS

(A) Preparation of Sulfonated Butyl

Exxon Butyl 365 having an unsaturation level of approximately 2.0 mole %, a Mooney viscosity (1+8) at 212° F. of about 45 and a viscosity average molecular weight of approximately 350,000,200 g of which were dissolved in 3000 ml of hexane by heating to about 40° C. for 6 hours. The polymer cement was cooled to room temperature and 6.89 ml (72.9 mmoles) of acetic anhydride added and stirred for 5 minutes. Next, 2.52 ml. (45.0 mmoles) of 95% sulfuric acid was added dropwise and the solution stirred for an additional 30 minutes. A solution of 11.9 g of zinc acetate in 4 ml. of distilled water and 160 ml. of methanol was added to the sulfonated polymer in solution to terminate the sulfonation reaction and neutralize the acid moiety. The neutralized sulfonated Butyl polymer (A) was isolated by steam stripping and drying on a rubber mill. Dietert sulfur analysis indicated a sulfonation level of approximately 15 meq. per 100 g of Butyl.

(B) Compound Formulations

The neutralized sulfonated Butyl polymer (A) 100 parts by weight was combined with 150 parts by weight of a finely divided calcium carbonate (Atomite) and 75 parts by weight of a rubber process oil (Sunpar 180) by the procedure described in Example III-B. This compound was designated (B-1). The rheological properties of Samples A and B-1 are illustrated in Table VIII.

TABLE VIII

EXTRUSION OF SULFONATED BUTYL COMPOSITIONS APPARENT VISCOSITY (POISE × $10^{-5}$) AT 200° C.

| Sample | A | B-1 | B-2 | B-3 |
|---|---|---|---|---|
| Extrusion Rate (sec$^{-1}$) |  |  |  |  |
| .73 | 8.08 | 5.21 | .96 | .86 |
| 7.3 | 1.75 | 1.30 | .34 | .22 |
| 73. | .30 | .34 | .10 | .09 |
| 291 | .10 | .14 | .05 | .04 |
| 728 | .05 | .08 | .03 | .02 |
| Melt Fracture Shear Rate (sec$^{-1}$) | 7.3 | 14 | 728 | None |

The neutralized sulfonated Butyl polymer (A) 100 parts by weight was combined with 100 parts by weight of a finely divided calcium carbonate (Atomite), 25 parts by weight of a rubber process oil (Sunpar 180), 20 parts by weight of a low density polyethylene (LD 605, M.I. 7.5) and 20 parts by weight of zinc stearate by the procedure described in Example III-B. This compound was designated B-2.

The neutralized sulfonated Butyl polymer (A) 100 parts by weight was combined with 40 parts by weight of a finely divided calcium carbonate (Atomite), 30 parts by weight of a rubber process oil (Sunpar 180), 20 parts by weight of a low density polyethylene (LD 605, M.I. 7.5), and 20 parts by weight of zinc stearate by the procedures described in Example III-B. This compound was designated B-3.

TABLE IX

PHYSICAL PROPERTIES OF SULFONATED BUTYL COMPOSITIONS

| Sample | B-1 | B-2 | B-3 |
|---|---|---|---|
| Tensile Properties | | | |
| 100% Mod. (psi) | 87 | 305 | 220 |
| 300% Mod. (psi) | 175 | 420 | 355 |
| Tensile Strength (psi) | 830 | 936 | 1150 |
| Elongation at break (%) | 1020 | 830 | 995 |
| Hardness (Shore A) | 43 | 64 | 53 |

This example illustrates several critical compositional variables associated with this invention. This example demonstrates that a hydrocarbon backbone other than EPDM, namely Butyl rubber can be employed in the instant invention. Furthermore, at a sulfonate level of approximately 15 meq. per 100 g Butyl, the resultant compositions prepared by the teachings of this invention possess excellent physical properties and flow properties. The necessity of employing a plasticizer is further illustrated by the rheological data in Table VIII. Both the neat sulfonated Butyl gum (A) and a compound comprising the gum, process oil, and mineral filler (B-1) result in materials which are not extrudable or injection moldable due to both their high viscosity and high melt elasticity. However, employing the combination of plasticizer and compounding ingredients results in a material with markedly improved rheological characteristics which is extrudable. Furthermore, both the tensile modulus and compound hardness are substantially improved as shown in Table IX.

EXAMPLE V (A) Preparation of Sulfonated EPDM

An ethylene-propylene-ethylidene norbornene terpolymer (V-2504-20) described in Example I, 200 g was dissolved in 2000 ml. of hexane. At room temperature, 6.89 ml. of acetic anhydride was added to the solution and stirred for 3 minutes. 2.52 ml. of 95% sulfuric acid was then added dropwise and allowed to react for 30 minutes. An aliquot of cement was taken and the polymer isolated for analysis by Dietert Sulfur. The reaction was simultaneously terminated and the acid neutralized by adding a solution of 11.58 g of zinc acetate in 160 ml. of methanol and 4 ml. of distilled water. After 30 minutes, 1 g of antioxidant 2246 was added and the solution allowed to stir for an additional 15 minutes. The neutralized sulfonated ethylene-propylene terpolymer (A) was isolated by steam stripping and drying on a rubber mill at 220° F. The Dietert Sulfur value indicated that 17 meq. of sulfonate had been incorporated per 100 g of EPDM.

(B) Preparation of Compounds

Several compounds were prepared by the methods described in Example II. The compositions are shown in Table X.

TABLE X

| | COMPOSITIONS | | | |
|---|---|---|---|---|
| Sample | 1 | 2 | 3 | 4 |
| Ingredients | | | | |
| A | 100 | 100 | 100 | 100 |
| Calcium Carbonate (Atomite) | 150 | 50 | 50 | 50 |
| Process Oil (Sunpar 180) | 75 | 25 | 25 | 25 |
| Polyethylene (LD-400) | | | 20 | 20 |
| Zinc Stearate | | 20 | 20 | |

(C) Characteristics

The extrusion characteristics of the compositions described in Part B of this Example were determined on an Instron Capillary Rheometer as described previously. The results are shown in Table XI.

TABLE XI

EXTRUSION OF MAGNESIUM NEUTRALIZED SULFO-EPDM COMPOSITIONS
APPARENT VISCOSITY (POISE × $10^{-5}$) AT 200° C.

| Sample | A | 1 | 2 | 3 | 4 |
|---|---|---|---|---|---|
| Extrusion Rate (sec$^{-1}$) | | | | | |
| .73 | 32.5 | 9.2 | 1.2 | 1.2 | 10.0 |
| 7.3 | 5.58 | 1.8 | .55 | .59 | 1.96 |
| 73. | .88 | .30 | .17 | .18 | .35 |
| 291 | .26 | .10 | .07 | .08 | .12 |
| 728 | .13 | .05 | .04 | .04 | .06 |
| Melt Fracture Shear Rate (sec$^{-1}$) | 7.3 | 14 | 1456 | 1456 | 146 |

The magnesium neutralized sulfo EPDM (A) is completely intractable (not processable by extrusion or injection molding) as indicated by the data in Table XI. Compounding with mineral filler and oil alone (Sample #1) or in combination with low density polyethylene (Sample #4) results in some improvement; however, the high viscosity and high melt elasticity precludes these compositions from being extruded or injection molded. However, the critical combination (Sample #3) of mineral filler, process oil and plasticizer (namely zinc stearate) converts the intractable system into one possessing excellent flow characteristics. The non-criticality of the plastic is illustrated by comparing Samples 2 and 3. The influence of the plastic is shown by the physical properties in Table XII.

TABLE XII

| | TENSILE PROPERTIES | | | | |
|---|---|---|---|---|---|
| Compound | A | 1 | 2 | 3 | 4 |
| 100% Mod. (psi) | | 76 | 273 | 209 | 199 |
| 300% Mod. (psi) | | 126 | 429 | 366 | 307 |
| Tensile Strength at Break (psi) | 340 | 170 | 902 | 752 | 418 |
| Elongation at break (%) | 310 | 600 | 700 | 715 | 503 |
| Hardness (Shore A) | | 45 | 66 | 61 | 62 |

The physical properties as shown in Table XII illustrate the superiority of the compositions of the instant invention namely Sample 2 and 3. As shown, the presence of polyethylene in Sample 2 acts to increase the hardness and modulate the tensile strength and tensile modulus.

Surprisingly, the physical properties of the compositions of this invention are superior to the original neutralized sulfonated gum (Sample A). Hence, both the flow properties and physical properties are enhanced simultaneously.

This example further demonstrates the low sulfonate level which can be employed. Also, the use of different cations for neutralization such as magnesium is illustrated.

EXAMPLE VI

(A) Compound Preparation

To 100 parts by weight of the sulfonated EPDM described in Example II, was added 85 parts by weight of process oil (Sunpar 180), 40 parts by weight of a mineral filler (calcium carbonate—Purecal U) 25 parts by weight of zinc oxide (Protox 166), 5 parts by weight of titanium dioxide, 15 parts by weight of wax (F-3504), 0.57 parts by weight of magnesium hydroxide, and 2 parts by weight of triethanolamine. This compound designated (VI-A) was prepared by mixing the ingredients in a 1-A Banbury for approximately 10 minutes, at which time the mix was dumped at approximately 300° F. The resultant material was then granulated.

(B) Shoe Molding

Compound VI-A was injection molded on a Desma rotary footwear machine. The granulated feed was supplied to the reciprocating screw section of the machine which was heated to a temperature of approximately 385° F. and injected into a footwear mold with a canvas covered last. The last was heated to approximately 150° F. The total cycle time for this operation was approximately 1 minute, however the injection time was only 10 to 20 seconds. Some 300 canvas sneakers in varying sizes were produced in this manner.

(C) Sneaker Evaluation

The Textile Services Division of United States Testing Company, Inc. was commissioned to evaluate the performance of the sneakers based on Sulfo-EPDM to commercially available materials. A triblock polymer of styrene-butadiene-styrene compounded for footwear applications and designated Kraton was evaluated along with a plasticized PVC compound and a cured rubber compound. The following tests were performed and the results herein described.

1. Abrasion Resistance

Specimens of the sole material of each sneaker were prepared and tested in accordance with ASTM-1630. The results of these tests were as follows:

| Sample | ABRASION INDEX | | | |
|---|---|---|---|---|
| | Run 1 | Run 2 | Run 3 | Average |
| Sulfo-EPDM Compound A | 72.3 | 58.4 | 48.2 | 59.6 |
| Vinyl | 45.3 | 44.9 | 42.7 | 44.3 |
| Kraton | 24.8 | 25.5 | 28.6 | 26.3 |
| Rubber | 39.0 | 40.7 | 38.0 | 39.2 |

The results indicate that the compound based on Sulfo-EPDM has a higher (better) abrasion index than that of plasticized Vinyl, Kraton, or cured rubber.

2. Flex Resistance

Specimens of the sole of each sample were prepared and tested in accordance with ASTM-D-1052 (Ross Flex), except that the aging temperature was reduced to 100° F.

The results of these tests were as follows:

| Sample | Cycles to Complete Failure (cracking) |
|---|---|
| A | No cut growth of either specimen at 100,000 cycles |
| Kraton | 76,000; 36,400 |
| Vinyl | No cut growth of either specimen at 100,000 cycles |
| Rubber | 27,400; 14,800 |

The results indicate a superiority of the compound based on Sulfo-EPDM over that of Kraton and cured rubber in terms of flex resistance.

3. Low Temperature Flex

One sneaker of each sample was placed in a cold chamber and the chamber temperature was lowered to and maintained at 0° F. for a period of 2 hours. At the end of this period and while at the test temperature, the sneakers were flexed manually to determine the effects of storage at this temperature. The test was repeated at −10° F. chamber temperature increments to a final temperature of −60° F.

The results of these tests were:

| Test Temperature, °F. | A | Vinyl | Kraton | Rubber |
|---|---|---|---|---|
| 0 | S | S | S | S |
| −10 | S | SLF | S | S |
| −20 | S | MLF | S | S |
| −30 | S | MLF | S | S |
| −40 | S | U | S | S |
| −50 | S | U | SLF | S |
| −60 | SLF | U | SLF | |

Code:
S = Satisfactory flexibility
SLF = Slight loss in flexibility
MLF = Moderate loss in flexibility
U = Unsatisfactory (board-like)

These results indicate the superiority of the sulfonated EPDM based compound over Vinyl. Thus, in terms of overall flexibility as measured by the Ross Flex (3) and low temperature flex (4), the compound based on Sulfonated EPDM is superior to plasticized Vinyl, Kraton and cured rubber.

4. Sole Hardness, Shore "A"

Shore "A" Hardness readings were obtained at five areas of each sole, as received, that is, the surface was not buffed and the values included any inherent "skin" hardness. The results of these tests were as follows:

| Sample | Shore "A" Hardness | Average |
|---|---|---|
| A | 50-50-47-51-51 | 50.0 |
| Kraton | 50-50-50-52-50 | 50.0 |
| Vinyl | 67-72-72-63-65 | 67.6 |
| Rubber | 62-65-60-61-60 | 61.6 |

The compound based on Sulfonated EPDM (A) is similar in hardness to that of the Kraton while the Vinyl and cured rubber compounds are harder. The sulfonated EPDM compound (A) possesses a very desirable rubbery feel characteristic particularly with regard to the vinyl compound which is somewhat plastic like and stiff in nature.

5. Coefficient of Friction

A six inch length of the sole of each sample, measured from the toe, was removed from the sneaker and used as the "sled" for the coefficient of friction test against waxed asphalt tile. Tests were conducted on an Instron Model TTC testing machine employing a 20 pound range and a crosshead speed of 12 inches per minute. The sled weight was 20 pounds.

The static (initiate motion) and dynamic (maintain motion) coefficients of friction were calculated from the data:

| | COEFFICIENT OF FRICTION | | | |
|---|---|---|---|---|
| | Static | | Dynamic | |
| Sample | Range | Average | Range | Average |
| A | .72–.77 | .74 | .70–.71 | .71 |
| Kraton | .49–.51 | .50 | .50–.51 | .51 |
| Vinyl | .55–.64 | .58 | .52–.63 | .56 |
| Rubber | .45–.46 | .46 | .41–.44 | .42 |

The coefficient of friction data indicate that the compound based on sulfonated EPDM has a higher static and dynamic coefficient of friction in comparison to Kraton, Vinyl and cured rubber. In a footwear sole application, this would provide better traction and stopping characteristics. This would be particularly advantageous on waxed floor surfaces and wet surfaces such as wet grass.

In general, the physical characteristics of the compound based on sulfonated EPDM is superior to those based on Kraton, plasticized Vinyl and cured rubber as illustrated in this example.

What is claimed is:

1. An elastomeric composition having a viscosity at 0.73 sec$^{-1}$ at 200° C. of less than about $8 \times 10^4$, and greater than $5 \times 10^3$ poises, said composition injection moldable into an elastomeric article, which consists essentially of:
    (a) a neutralized sulfonated elastomeric polymer having a viscosity at 0.73 sec$^{-1}$ at 200° C. of about $3 \times 10^5$ poises to about $5 \times 10^6$ poises and about 15 to about 50 meq. neutralized metal sulfonate groups per 100 grams of said neutralized sulfonated elastomeric polymer;
    (b) about 25 to about 150 parts by weight of a non-polar process oil per 100 parts by weight of said neutralized sulfonated elastomeric polymer, said non-polar process oil having less than about 2 wt. % polar type compounds therein;
    (c) about 25 to about 300 parts by weight of an inorganic filler per 100 parts by weight of said neutralized sulfonated elastomeric polymer, said inorganic filler being selected from the group consisting of clay, talc, and calcium carbonate and mixtures thereof, a ratio of said inorganic filler to said non-polar process oil being about 0.6 to about 1.25, and
    (d) at least 8 parts by weight of a preferential ionic plasticizer per 100 parts by weight of said neutralized sulfonated elastomeric polymer, said preferential plasticizer having a melting point of at least 25° C. and is selected from the group consisting of carboxylic acids having about 5 to about 30 carbon atoms and salts of said carboxylic acids and mixtures thereof, an ion of said salt being selected from the group consisting of aluminum, ammonium, lead, Cd, Hg, and Groups IA, IIA and IB of the Periodic Table of Elements.

2. A composition according to claim 1, wherein said neutralized sulfonated elastomeric polymer is formed from an elastomeric polymer selected from the group consisting of Butyl rubber and an EPDM terpolymer.

3. A composition according to claim 2, wherein said EPDM terpolymer consists essentially of about 40 to about 75 wt. % of ethylene, of about 10 to about 53 wt. % of propylene and of about 1 to about 10 wt. % of a non-conjugated diene.

4. A composition according to claim 1, wherein said sulfonate groups are neutralized with a counterion being selected from the group consisting of ammonium, antimony, aluminum, lead and Groups I-A, II-A, I-B and II-B of the Periodic Table of Elements and mixtures thereof.

5. A composition according to claim 5, wherein said non-conjugated diene is selected from the group consisting of 1,4-hexadiene, dicyclopentadiene, alkylidene substituted norbornenes, alkenyl substituted norbornenes and tetrahydroindenes.

6. A composition according to claim 5, wherein said non-conjugated diene is 5-ethylidene-2-norbornene.

7. A composition according to claim 1, having a Shore Hardness A of about 45 to about 70.

8. A composition according to claim 1, wherein said preferential plasticizer is a combination of stearic acid and a metallic salt of said stearic acid, a metal ion of said metallic salt being selected from the group consisting of lead, antimony, aluminum, and Groups I-A, II-A, I-B and II-B of the Periodic Table of Elements and mixtures thereof.

9. A composition according to claim 1, wherein said filler has a particle size of about 0.03 to about 20 microns.

10. A composition according to claim 1, wherein said filler has an oil absorption of about 10 to about 100.

11. A composition according to claim 1, wherein said non-polar process oil is selected from the group consisting of paraffinic, naphthenic or aromatics and mixtures thereof.

12. A composition according to claim 1, wherein said non-polar process oil is paraffinic having an Mn of about 400 to about 1000.

13. An elastomeric composition according to claim 1, wherein said non-polar process oil is a paraffinic oil.

14. An elastomeric composition having a viscosity at 0.73 sec$^{-1}$ at 200° C. of about $5 \times 10^3$ to about $8 \times 10^4$ poises, said composition formable by extrusion or injection molding into an elastomeric article, which consists essentially of:
    (a) a neutralized sulfonated elastomeric polymer having a viscosity at 0.73 sec$^{-1}$ at 200° C. of about $3 \times 10^5$ poises to about $5 \times 10^6$ poises and about 15 to about 50 meq. neutralized sulfonate groups per 100 grams of said neutralized sulfonated elastomeric polymer;
    (b) about 25 to about 150 parts by weight of a non-polar process oil per 100 parts by weight of said neutralized sulfonated elastomeric polymer, said non-polar process oil having less than about 2 wt. % polar type compounds therein;
    (c) about 25 to about 300 parts by weight of an inorganic filler per 100 parts by weight of said neutralized sulfonated elastomeric polymer, said inorganic filler being selected from the group consisting of clay, talc, and calcium carbonate and mixtures thereof, a ratio of said inorganic filler to said non-polar process oil being about 0.6 to about 1.25; and
    (d) at least 8 parts by weight of a preferential plasticizer per one hundred parts by weight of said neutralized sulfonated elastomeric polymer, said preferential plasticizer being a mixture of a carboxylic acid having about 5 to about 30 carbon atoms and zinc stearate.

15. A composition according to claim 14 wherein said neutralized sulfonated elastomeric polymer is formed from an elastomeric polymer selected from the group consisting of Butyl rubber and an EPDM terpolymer.

16. A composition according to claim 14 wherein said EPDM terpolymer consists essentially of about 40 to about 75 wt. % of ethylene, of about 10 to about 53 wt. % of propylene and of about 2 to about 10 wt. % of a non-conjugated diene.

17. A composition according to claim 16 wherein said non-conjugated diene is selected from the group consisting of 1,4-hexadiene, dicyclopentadiene, 5-alkylidene-2-norbornenes, 5-alkenyl-2-norbornenes and tetrahydroindene.

18. A composition according to claim 17 wherein said non-conjugated diene is 5-ethylidene-2-norbornene.

19. An elastomeric article formed from an elastomeric composition consisting essentially of:
(a) a neutralized sulfonated elastomeric polymer having a viscosity at 0.73 sec$^{-1}$ at 200° C. of about $3 \times 10^5$ poises to about $5 \times 10^6$ poises and about 15 to about 50 meq. neutralized sulfonate groups per 100 grams of said neutralized sulfonated elastomeric polymer;
(b) about 25 to about 150 parts by weight of a non-polar process oil per 100 parts by weight of said neutralized sulfonated elastomeric polymer, said non-polar process oil having less than about 2 wt. % polar type compounds therein;
(c) about 25 to about 300 parts by weight of an inorganic filler per 100 parts by weight of said neutralized sulfonated elastomeric polymer, said inorganic filler being selected from the group consisting of clay, talc, and calcium carbonate and mixtures thereof, a ratio of said inorganic filler to said non-polar process oil being about 0.6 to about 1.25; and
(d) at least 8 parts by weight of a preferential ionic plasticizer per 100 parts by weight of said neutralized sulfonated elastomeric polymer, said preferential plasticizer having a melting point of at least 25° C. and is selected from the group consisting of carboxylic acids having about 5 to about 30 carbon atoms and salts of said carboxylic acids and mixtures thereof, an ion of said salt being selected from the group consisting of aluminum, ammonium, lead, Cd, Hg, and Groups IA, IIA and IB of the Periodic Table of Elements.

20. An elastomeric article according to claim 19, wherein said neutralized sulfonated elastomeric polymer is formed from an elastomeric polymer selected from the group consisting of Butyl rubber and an EPDM terpolymer.

21. An elastomeric article according to claim 19, wherein said sulfonated groups are neutralized with a counterion being selected from the group consisting of antimony, iron, aluminum, lead and Groups IA, IIA, IB and IIB of the Periodic Table of Elements and mixtures thereof.

22. An elastomeric article according to claim 20, wherein said EPDM terpolymer consists of about 40 to about 75 wt. % ethylene, of about 10 to about 53 wt. % of propylene, and of about 2 to about 10 wt. % of a conjugated diene.

23. An elastomeric article according to claim 22, wherein said non-conjugated diene is selected from the group consisting of 1,4-hexadiene, dicyclopentadiene, 5-alkylidene-2-norbornenes, 5-alkenyl-2-norbornenes and tetrahydroindene.

24. An elastomeric article formed from an elastomeric composition consisting essentially of:
(a) a neutralized sulfonated elastomeric polymer having a viscosity at 0.73 sec$^{-1}$ at 200° C. of about $3 \times 10^5$ poises to about $5 \times 10^6$ poises and about 15 to about 50 meq. neutralized sulfonate groups per 100 grams of said neutralized sulfonated elastomeric polymer;
(b) about 25 to about 150 parts by weight of a non-polar process oil per 100 parts by weight of said neutralized sulfonated elastomeric polymer, said non-polar process oil having less than about 2 wt. % polar type compounds therein;
(c) about 25 to about 300 parts by weight of an inorganic filler per 100 parts by weight of said neutralized sulfonated elastomeric polymer, said inorganic filler being selected from the group consisting of clay, talc, and calcium carbonate and mixtures thereof, a ratio of said inorganic filler to said non-polar process oil being about 0.6 to about 1.25; and
(d) at least 8 parts by weight of a preferential plasticizer per one hundred parts by weight of said neutralized sulfonated elastomeric polymer, said preferential plasticizer being a mixture of a carboxylic acid having about 5 to about 30 carbon atoms and zinc stearate.

25. An elastomeric article according to claim 24, wherein said neutralized sulfonated elastomeric polymer is formed from an elastomeric polymer selected from the group consisting of Butyl rubber and an EPDM terpolymer.

26. An elastomeric article according to claim 25, wherein said EPDM terpolymer consists of about 40 to about 75 wt. % ethylene, of about 10 to about 53 wt. % of propylene, and of about 2 to about 10 wt. % of a conjugated diene.

27. An elastomeric article according to claim 26, wherein said non-conjugated diene is selected from the group consisting of 1,4-hexadiene, dicyclopentadiene, 5-alkylidene-2-norbornenes, 5-alkenyl-2-norbornenes and tetrahydroindene.

* * * * *